United States Patent
Hara et al.

(10) Patent No.: US 8,384,345 B2
(45) Date of Patent: Feb. 26, 2013

(54) CONTROL METHOD FOR LITHIUM ION SECONDARY BATTERY, AND LITHIUM ION SECONDARY BATTERY SYSTEM

(75) Inventors: Tomitaro Hara, Okazaki (JP); Akira Tsujiko, Miyoshi (JP); Takuichi Arai, Toyota (JP); Tsuyoshi Yano, Toyota (JP); Daisuke Teramoto, Toyota (JP); Sachie Yuasa, Okazaki (JP); Keiko Wasada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 140 days.

(21) Appl. No.: 13/056,686

(22) PCT Filed: Jun. 30, 2009

(86) PCT No.: PCT/IB2009/006111
§ 371 (c)(1),
(2), (4) Date: Apr. 7, 2011

(87) PCT Pub. No.: WO2010/013102
PCT Pub. Date: Feb. 4, 2010

(65) Prior Publication Data
US 2012/0105006 A1    May 3, 2012

(30) Foreign Application Priority Data

Aug. 1, 2008   (JP) ................ 2008-199774

(51) Int. Cl.
*H02J 7/00*      (2006.01)
*H02J 7/16*      (2006.01)
(52) U.S. Cl. ........ 320/104; 320/108; 320/107; 320/134; 320/136

(58) Field of Classification Search ............... 320/107, 320/108, 103, 134, 135, 109, 127, 131, 136, 320/137, 139, 140; 429/517, 122, 128
See application file for complete search history.

(56) References Cited

U.S. PATENT DOCUMENTS 5,583,418 A * 12/1996 Honda et al. .............. 320/109
6,788,068 B2 * 9/2004 Arai ........................... 324/430
(Continued)

FOREIGN PATENT DOCUMENTS

JP     2001-6750      1/2001
JP     2003-9415      1/2003
(Continued)

OTHER PUBLICATIONS

International Search Report in International Application No. PCT/IB2009/006111; Mailing Date: Nov. 12, 2009.
(Continued)

*Primary Examiner* — Edward Tso
*Assistant Examiner* — Alexis Boateng
(74) *Attorney, Agent, or Firm* — Finnegan, Henderson, Farabow, Garrett & Dunner, LLP

(57) ABSTRACT

A control method for a lithium ion secondary battery includes performing a charging step of charging the lithium ion secondary battery with a predetermined quantity of electricity when the battery voltage of the lithium ion secondary battery has decreased to a lower limit battery voltage that is set at a value that falls within a range higher than $(B-C)$ V and lower than or equal to $(B-C+0.2)$ V where a maximum value of a positive electrode potential of a flat portion in a discharge positive electrode potential curve is B (V) and a negative electrode dissolution potential is C (V). It is possible to suppress a dissolution of a negative electrode current collector of the lithium ion secondary battery to prevent the service life of the lithium ion secondary battery from shortening because of an internal short circuit.

12 Claims, 8 Drawing Sheets

U.S. PATENT DOCUMENTS

| | | | |
|---|---|---|---|
| 6,850,038 B2 * | 2/2005 | Arai et al. | 320/132 |
| 7,202,632 B2 * | 4/2007 | Namba | 320/132 |
| 8,018,203 B2 * | 9/2011 | Nishi et al. | 320/136 |
| 2004/0023117 A1 | 2/2004 | Imachi et al. | |
| 2006/0093894 A1 * | 5/2006 | Scott et al. | 429/50 |
| 2006/0097701 A1 * | 5/2006 | Kodama et al. | 320/147 |
| 2006/0216605 A1 | 9/2006 | Shirakata et al. | |
| 2007/0254209 A1 | 11/2007 | Baba et al. | |
| 2007/0284159 A1 | 12/2007 | Takami et al. | |
| 2010/0000809 A1 * | 1/2010 | Nishi et al. | 180/65.29 |

FOREIGN PATENT DOCUMENTS

| | | |
|---|---|---|
| JP | 2003-36889 | 2/2003 |
| JP | 2003-259508 | 9/2003 |
| JP | 2006-12613 | 1/2006 |
| JP | 2006-304551 | 11/2006 |
| JP | 2007-234565 | 9/2007 |
| JP | 2007-250433 | 9/2007 |
| JP | 2007-335157 | 12/2007 |
| WO | WO 2006/050099 A1 | 5/2006 |
| WO | WO 2008/041684 A1 | 4/2008 |

OTHER PUBLICATIONS

Written Opinion in International Application No. PCT/IB2009/006111; Mailing Date: Nov. 12, 2009.

Applicant's Response to Written Opinion in International Application No. PCT/IB2009/006111 (May 4, 2010).

International Preliminary Report on Patentability in International Application No. PCT/IB2009/006111; Completion Date: Nov. 23, 2010.

Notification of Reason(s) for Refusal in JP 2008-199774; Drafting Date: Dec. 24, 2010.

* cited by examiner

CONTROL METHOD FOR LITHIUM ION SECONDARY BATTERY, AND LITHIUM ION SECONDARY BATTERY SYSTEM

CROSS-REFERENCE TO RELATED APPLICATIONS

This application is a national phase application of International Application No. PCT/IB2009/006111, filed Jun. 30, 2009, and claims the priority of Japanese Application No. 2008-199774, filed Aug. 1, 2008, the contents of both of which are incorporated herein by reference.

BACKGROUND OF THE INVENTION

1. Field of the Invention

The invention relates to a control method for a lithium ion secondary battery, and a lithium ion secondary battery system.

2. Description of the Related Art

In recent years, there has been proposed a lithium ion secondary battery that uses a lithium-transition metal composite oxide with an olivine structure, expressed by a composition formula of $LiFePO_4$, or the like, as a positive electrode active material, and that uses a carbon-based material as a negative electrode active material (see Japanese Patent Application Publication No. 2003-36889 (JP-A-2003-36889) and Japanese Patent Application Publication No. 2006-12613 (JP-A-2006-12613)). The lithium-transition metal composite oxide with an olivine structure, expressed by $LiFePO_4$, or the like, has a substantially constant charge and discharge potential when charged and discharged. The charge and discharge potential remains substantially unchanged even when lithium ions are desorbed or absorbed. This is because the lithium-transition metal composite oxide with an olivine structure, expressed, for example, by $LiFePO_4$, enters a two-phase coexistence state of $LiFePO_4$ and $FePO_4$ when Li is absorbed or desorbed.

Thus, by using a positive electrode active material, such as $LiFePO_4$, that undergoes charge and discharge in a two-phase coexistence state, it is possible to construct a lithium ion secondary battery with less variations in input density and output density against a variation in state of charge, and with stable output characteristics. In recent years, a research for using such a lithium ion secondary battery as a driving source for a hybrid vehicle has been conducted.

Incidentally, the above lithium ion secondary battery has a characteristic such that a negative electrode potential increases in the late stage of discharging. JP-A-2003-36889 and JP-A-2006-12613 suggest that copper is used as the material of a negative electrode current collector. However, the negative electrode current collector made of copper (copper foil, or the like) dissolves as the negative electrode potential increases to about 1.2 V. After that, a short circuit (internal short circuit) occurs between the positive and negative electrodes because of precipitation of dissolved copper, and this may shorten the service life. For this reason, it has been necessary to control the negative electrode potential so that the negative electrode potential does not increase to a dissolution potential at which the negative electrode current collector dissolves.

When the lithium ion secondary battery is used as a power source for a hybrid vehicle, electric power stored in the lithium ion secondary battery is consumed by, for example, an electronic equipment (a battery controller, an air conditioner, an audio equipment, and the like) mounted on the vehicle even when the hybrid vehicle is stopped (when the hybrid vehicle is not running but is runnable, and when an engine is not operating). Therefore, when the hybrid vehicle is continuously stopped for a long period of time in a state where the negative electrode potential has reached a value close to the dissolution potential of the negative electrode current collector, there is a possibility that the negative electrode potential increases with a reduction in the amount of electric charge stored, and, as a result, the negative electrode potential reaches the dissolution potential of the negative electrode current collector.

SUMMARY OF THE INVENTION

The invention provides a control method for a lithium ion secondary battery and a lithium ion secondary battery system that suppress a dissolution of a negative electrode current collector to prevent the service life of the battery from shortening because of an internal short circuit.

A first aspect of the invention relates to a control method for a lithium ion secondary battery that includes a positive electrode having a positive electrode active material that undergoes charge and discharge in a two-phase coexistence state and a negative electrode having a negative electrode active material and a negative electrode current collector. The lithium ion secondary battery has a characteristic such that, when a negative electrode potential at which the negative electrode current collector dissolves is a negative electrode dissolution potential and a battery voltage of the lithium ion secondary battery, at which the negative electrode potential has reached the negative electrode dissolution potential, is a dissolution battery voltage, and when, among points located on a discharge positive electrode potential curve that represents behavior of a positive electrode potential when the lithium ion secondary battery is discharged so that the battery voltage of the lithium ion secondary battery decreases from an upper limit battery voltage to the dissolution battery voltage, a point that indicates a positive electrode potential at which the negative electrode potential is the negative electrode dissolution potential is a positive electrode dissolution corresponding point and a point that indicates a positive electrode potential at which the battery voltage is the upper limit battery voltage is a positive electrode upper limit corresponding point, the discharge positive electrode potential curve has a flat portion, at which a variation width of the positive electrode potential is within 0.1 V, over 50% or above of a range starting from the positive electrode dissolution corresponding point to the positive electrode upper limit corresponding point within an electricity quantity range from the positive electrode upper limit corresponding point to the positive electrode dissolution corresponding point, and, when the lithium ion secondary battery is discharged so that the battery voltage of the lithium ion secondary battery decreases from the upper limit battery voltage to the dissolution battery voltage, the negative electrode potential, in a late stage of discharging, increases as the negative electrode potential approaches the negative electrode dissolution potential and then reaches the negative electrode dissolution potential. The control method for a lithium ion secondary battery includes performing a charging step of charging the lithium ion secondary battery with a predetermined quantity of electricity when the battery voltage of the lithium ion secondary battery has decreased to a lower limit battery voltage that is set at a value that falls within a range higher than (B−C) V and lower than or equal to (B−C+0.2) V where a maximum value of the positive electrode potential of the flat portion is B (V) and the negative electrode dissolution potential is C (V).

With the control method according to the first aspect of the invention, the lithium ion secondary battery is forcibly charged with a predetermined quantity of electricity when the battery voltage of the lithium ion secondary battery has decreased to a lower limit battery voltage that is set at a value that falls within a range higher than (B−C) V and lower than or equal to (B−C+0.2) V where a maximum value of the positive electrode potential of the flat portion is B (V) and the negative electrode dissolution potential is C (V).

Here, the battery voltage (dissolution battery voltage) of the lithium ion secondary battery at the time when the negative electrode potential has reached the negative electrode dissolution potential C (V) is a value (A−C) V that is obtained by subtracting the negative electrode dissolution potential C (V) from the positive electrode potential (the positive electrode dissolution potential is denoted by A) (V) at this time. In the first aspect of the invention, the controlled lithium ion secondary battery (before the capacity of the negative electrode decreases (for example, in an initial state)) has a characteristic such that the discharge positive electrode potential curve has the flat portion over 50% or above of a range starting from the positive electrode dissolution corresponding point to the positive electrode upper limit corresponding point within an electricity quantity range from the positive electrode upper limit corresponding point to the positive electrode dissolution corresponding point. Thus, the positive electrode dissolution potential A (V) is a value indicated by a point in the flat portion of the discharge positive electrode potential curve (positive electrode dissolution corresponding point). Because the positive electrode potential of the flat portion is a value that falls within a range higher than or equal to B−0.1 (V) and lower than or equal to B (V), the dissolution battery voltage (A−C) is a value that falls within a range higher than or equal to (B−0.1−C) V and lower than or equal to (B−C) V.

Thus, the lower limit battery voltage is set at a value higher than (B−C) V and, when the battery voltage has decreased to the lower limit battery voltage, the lithium ion secondary battery is forcibly charged with a predetermined quantity of electricity. By so doing, it is possible to prevent the battery voltage from decreasing to the dissolution battery voltage, that is, to prevent the negative electrode potential from increasing to the negative electrode dissolution potential C (V). Hence, it is possible to suppress a dissolution of the negative electrode current collector to prevent the service life of the battery from shortening because of an internal short circuit.

In addition, in the control method according to the first aspect of the invention, the lower limit battery voltage is set at a value lower than or equal to (B−C+0.2) V. Thus, the difference between the lower limit battery voltage and the dissolution battery voltage is (B−C+0.2)−(B−0.1−C)=0.3 V at most. That is, the lower limit battery voltage is set at a value that is exceedingly close to the dissolution battery voltage, and the difference between the lower limit battery voltage and the dissolution battery voltage is within 0.3 V. By so doing, it is possible to discharge the lithium ion secondary battery until the battery voltage reaches a value close to the dissolution battery voltage, so the discharge capacity may be increased.

In addition, in the first aspect of the invention, the capacity of the controlled lithium ion secondary battery may degrade with use. However, this is mainly caused by degradation (decrease in capacity) of the negative electrode (negative electrode active material). This is because the positive electrode active material (LiFePO$_4$, or the like) that undergoes charge and discharge in a two-phase coexistence state is exceedingly resistant to degradation (decrease in capacity). Therefore, even when a decrease in capacity proceeds with use, the positive electrode potential of the flat portion in the discharge positive electrode potential curve remains almost unchanged. Furthermore, the negative electrode dissolution potential is determined on the basis of a component (metal) that composes the negative electrode current collector, so the negative electrode dissolution potential remains almost unchanged even when a decrease in capacity proceeds with use.

In addition, in the lithium ion secondary battery before the capacity of the negative electrode decreases (in an initial state), the discharge positive electrode potential curve has the flat portion over 50% or above of a range starting from the positive electrode dissolution corresponding point to the positive electrode upper limit corresponding point within an electricity quantity range from the positive electrode dissolution corresponding point to the positive electrode upper limit corresponding point. Thus, even when a decrease in capacity proceeds with use (at least until the capacity decreases by half), the positive electrode potential when the negative electrode potential has reached the negative electrode dissolution potential C is lower than or equal to the maximum value B of the positive electrode potential of the flat portion, and the battery voltage is lower than or equal to (B−C) V.

In consideration of the above battery characteristics, in the first aspect of the invention, as described above, the lower limit battery voltage is set at a value higher than (B−C) V, and, when the battery voltage has decreased to the lower limit battery voltage, the lithium ion secondary battery is forcibly charged with the predetermined quantity of electricity. By so doing, even when a decrease in capacity of the battery (negative electrode) proceeds (at least until the capacity decreases by half), it is possible to prevent the battery voltage from decreasing to the dissolution battery voltage, that is, to prevent the negative electrode potential from increasing to the negative electrode dissolution potential C (V). Thus, even when a decrease in capacity of the battery (negative electrode) proceeds, it is possible to suppress a dissolution of the negative electrode current collector to prevent the service life of the battery from shortening because of an internal short circuit.

Note that in the specification, the positive electrode potential and the negative electrode potential refer to a potential (vs. Li/Li+) with respect to a lithium ion. In addition, the negative electrode active material of the controlled lithium ion secondary battery may be, for example, a carbon-based material. The carbon-based material may be a natural graphite-based material, an artificial graphite-based material (mesocarbon microbead, or the like), a non-graphitizable carbon-based material, or the like.

Furthermore, in the first aspect of the invention, the lithium ion secondary battery may be mounted on a hybrid vehicle, and the control method for a lithium ion secondary battery may perform the charging step when the hybrid vehicle is stopped.

In the related art, if it is configured to be dischargeable until the battery voltage reaches a value close to the dissolution battery voltage, as described above, there is a possibility that, when the hybrid vehicle is stopped, the battery voltage may reach the dissolution battery voltage (that is, the negative electrode potential may reach the negative electrode dissolution potential) and may allow a dissolution of the negative electrode current collector to progress.

Here, the state when the hybrid vehicle is stopped means a state when the hybrid vehicle is not running but is runnable, and when an engine is not operating. The state when the hybrid vehicle is runnable means a state where electric power can be supplied from the lithium ion secondary battery to a motor for driving the hybrid vehicle and the hybrid vehicle can run when an accelerator pedal is depressed. When the hybrid vehicle is stopped, electric power stored in the lithium ion secondary battery is consumed by, for example, an electronic equipment (a battery controller, an air conditioner, an audio equipment, and the like) mounted on the vehicle (that is, the lithium ion secondary battery is discharging).

In contrast, in the control method according to the first aspect of the invention, when the hybrid vehicle is stopped, and when the battery voltage of the lithium ion secondary battery has decreased to the lower limit battery voltage, the lithium ion secondary battery is forcibly charged with a predetermined quantity of electricity. By so doing, even when the hybrid vehicle is stopped, it is possible to prevent the battery voltage of the lithium ion secondary battery from reaching the dissolution battery voltage (that is, to prevent the negative electrode potential from reaching the negative electrode dissolution potential) to thereby suppress a dissolution of the negative electrode current collector. Thus, it is possible to prevent the service life of the battery from shortening because of an internal short circuit. In addition, it is possible to allow an operating electronic equipment to operate continuously.

Note that a method of charging the lithium ion secondary battery in the charging step may be, for example, a method of charging the battery through power generation by operating the engine or a method of supplying electric power from an auxiliary battery mounted on the vehicle to the lithium ion secondary battery.

Furthermore, in the charging step, the predetermined quantity of electricity may correspond to 5% or above of a quantity of electricity that is discharged from the lithium ion secondary battery when the battery voltage of the lithium ion secondary battery decreases from the upper limit battery voltage to the lower limit battery voltage.

If the quantity of electricity with which the lithium ion secondary battery is charged in the charging step is small, the battery voltage decreases to the lower limit battery voltage again for a short period of time. Because the lower limit battery voltage is a value that is exceedingly close to the dissolution battery voltage at which the negative electrode current collector dissolves, the battery voltage may be set so as not to approach the lower limit battery voltage.

Then, in the charging step, by charging the quantity of electricity corresponding to 5% or above the quantity of electricity discharged from the lithium ion secondary battery when the battery voltage of the lithium ion secondary battery decreases from the upper limit battery voltage to the lower limit battery voltage, it is possible to keep the battery voltage far away from the lower limit battery voltage. By so doing, it is possible to keep the negative electrode potential far away from the negative electrode dissolution potential C. Thus, it is possible to decrease the possibility that the negative electrode potential approaches the negative electrode dissolution potential C.

Furthermore, in the charging step, the predetermined quantity of electricity may be a quantity of electricity corresponding to 5% or above and 10% or below of a quantity of electricity that is discharged from the lithium ion secondary battery when the battery voltage of the lithium ion secondary battery decreases from the upper limit battery voltage to the lower limit battery voltage.

As a quantity of electricity with which the battery is charged is increased in the charging step, the possibility that the negative electrode potential approaches the negative electrode dissolution potential C may be decreased. However, an excessive charge deteriorates energy efficiency (for example, when the engine is operated for power generation to charge the battery, fuel is wastefully consumed). The quantity of electricity with which the battery is charged is set at a quantity of electricity corresponding to 5% or above and 10% or below of the quantity of electricity discharged from the lithium ion secondary battery when the battery voltage of the lithium ion secondary battery decreases from the upper limit battery voltage to the lower limit battery voltage. Thus, it is possible to suppress a decrease in energy efficiency while decreasing the possibility that the negative electrode potential approaches the negative electrode dissolution potential C.

Furthermore, any of the above described control methods for a lithium ion secondary battery may include performing a voltage detecting step of detecting the battery voltage of the lithium ion secondary battery when the hybrid vehicle is stopped; and performing a lower limit determination step of determining whether the battery voltage detected in the voltage detecting step has decreased to the lower limit battery voltage, wherein the charging step may be performed when it is determined in the lower limit determination step that the battery voltage has decreased to the lower limit battery voltage.

With the control method according to the first aspect of the invention, the charging step is performed when it is determined that the battery voltage detected at the time when the hybrid vehicle is stopped has decreased to the lower limit battery voltage. The battery voltage is stable when the hybrid vehicle is stopped than when the hybrid vehicle is running. Therefore, it is determined whether the battery voltage has decreased to the lower limit battery voltage on the basis of the battery voltage detected at the time when the hybrid vehicle is stopped, so it is possible to increase the accuracy of determination. In the control method according to the first aspect of the invention, the charging step is performed on the basis of the above accurate determination result, so it is possible to further appropriately prevent the negative electrode potential from increasing to the negative electrode dissolution potential C (V).

Furthermore, any of the above control methods for a lithium ion secondary battery may include performing an abnormality determination step of determining that the lithium ion secondary battery is abnormal when the battery voltage of the lithium ion secondary battery after the charging step has been performed is not higher than the lower limit battery voltage.

When the lithium ion secondary battery is normal (serviceable), the battery voltage after the charging step has been performed should be higher than the lower limit battery voltage. Thus, in the control method according to the first aspect of the invention, when there is an abnormality (for example, internal short circuit) in the lithium ion secondary battery, it is possible to appropriately determine the abnormality.

Furthermore, in the first aspect of the invention, the positive electrode active material may be a chemical compound expressed by $LiM1_{(1-x)}M2_xPO_4$ (where M1 is any one of Fe or Mn, M2 is at least any one of Mn, Cr, Co, Cu, Ni, V, Mo, Ti, Zn, Al, Ga, B or Nb (provided that Mn is excluded when M1 is Mn), and $0 \leqq X \leqq 0.1$).

When the chemical compound expressed by the above composition formula is used as the positive electrode active material, the flat portion appears over a wide electricity quantity range in the discharge positive electrode potential curve. In addition, the above chemical compound is exceedingly resistant to degradation. Thus, even when the negative electrode active material largely degrades, variations of the discharge positive electrode potential curve are extremely small. Thus, even when a decrease in capacity proceeds with use, the positive electrode potential at the time when the negative electrode potential has reached the negative electrode dissolution potential C is lower than or equal to the maximum value B of the positive electrode potential of the flat portion, and the battery voltage is lower than or equal to (B−C) V.

Thus, with the control method according to the first aspect of the invention, even when a decrease in capacity of the battery (negative electrode) proceeds, it is possible to appropriately prevent the battery voltage from decreasing to the dissolution battery voltage, that is, to appropriately prevent the negative electrode potential from increasing to the negative electrode dissolution potential C (V). Thus, it is possible to prevent a dissolution of the negative electrode current collector to prevent the service life of the battery from shortening because of an internal short circuit.

Furthermore, in the first aspect of the invention, the positive electrode active material may be $LiFePO_4$, the negative electrode current collector may be made of copper, and the lower limit battery voltage may be set at a value that falls within a range higher than 2.2 V and lower than or equal to 2.4 V.

When $LiFePO_4$ is used as the positive electrode active material, the maximum value B of the positive electrode potential of the flat portion is about 3.4 V. When the negative electrode current collector made of copper is used, the negative electrode dissolution potential C (negative electrode potential at which the negative electrode current collector dissolves) is about 1.2 V. Thus, the dissolution battery voltage (battery voltage at the time when the negative electrode potential reaches the negative electrode dissolution potential C) is about 2.2 V (=3.4−1.2).

Thus, by executing control in such a manner that the lower limit battery voltage is set at a value that falls within a range higher than 2.2 V and lower than or equal to 2.4 V, even when the hybrid vehicle is stopped, it is possible to prevent the negative electrode potential from increasing to 1.2 V (negative electrode dissolution potential C).

A second aspect of the invention relates to a lithium ion secondary battery system. The lithium ion secondary battery system includes: a lithium ion secondary battery that includes a positive electrode having a positive electrode active material that undergoes charge and discharge in a two-phase coexistence state and a negative electrode having a negative electrode active material and a negative electrode current collector; and control means that controls charge and discharge of the lithium ion secondary battery. The lithium ion secondary battery has a characteristic such that, when a negative electrode potential at which the negative electrode current collector dissolves is a negative electrode dissolution potential and a battery voltage of the lithium ion secondary battery, at which the negative electrode potential has reached the negative electrode dissolution potential, is a dissolution battery voltage, and when, among points located on a discharge positive electrode potential curve that represents behavior of a positive electrode potential when the lithium ion secondary battery is discharged so that the battery voltage of the lithium ion secondary battery decreases from an upper limit battery voltage to the dissolution battery voltage, a point that indicates a positive electrode potential at which the negative electrode potential is the negative electrode dissolution potential is a positive electrode dissolution corresponding point and a point that indicates a positive electrode potential at which the battery voltage is the upper limit battery voltage is a positive electrode upper limit corresponding point, the discharge positive electrode potential curve has a flat portion, at which a variation width of the positive electrode potential is within 0.1 V, over 50% or above of a range starting from the positive electrode dissolution corresponding point to the positive electrode upper limit corresponding point within an electricity quantity range from the positive electrode upper limit corresponding point to the positive electrode dissolution corresponding point, and, when the lithium ion secondary battery is discharged so that the battery voltage of the lithium ion secondary battery decreases from the upper limit battery voltage to the dissolution battery voltage, the negative electrode potential, in a late stage of discharging, increases as the negative electrode potential approaches the negative electrode dissolution potential and then reaches the negative electrode dissolution potential. The control means executes control to charge the lithium ion secondary battery with a predetermined quantity of electricity when the battery voltage of the lithium ion secondary battery has decreased to a lower limit battery voltage that is set at a value that falls within a range higher than (B−C) V and lower than or equal to (B−C+0.2) V where a maximum value of the positive electrode potential of the flat portion is B (V) and the negative electrode dissolution potential is C (V).

With the lithium ion secondary battery system according to the second aspect of the invention, the lithium ion secondary battery is forcibly charged with a predetermined quantity of electricity when the battery voltage of the lithium ion secondary battery has decreased to a lower limit battery voltage that is set at a value that falls within a range higher than (B−C) V and lower than or equal to (B−C+0.2) V where a maximum value of the positive electrode potential of the flat portion is B (V) and the negative electrode dissolution potential is C (V).

As described above, the lower limit battery voltage is set at a value higher than (B−C) V and, when the battery voltage has decreased to the lower limit battery voltage, the lithium ion secondary battery is forcibly charged with a predetermined quantity of electricity. By so doing, it is possible to prevent the battery voltage from decreasing to the dissolution battery voltage, that is, to prevent the negative electrode potential from increasing to the negative electrode dissolution potential C (V). Hence, it is possible to suppress a dissolution of the negative electrode current collector to prevent the service life of the battery from shortening because of an internal short circuit.

In addition, the lower limit battery voltage is set at a value lower than or equal to (B−C+0.2) V, that is, a value exceedingly close to the dissolution battery voltage. By so doing, it is possible to discharge the lithium ion secondary battery until the battery voltage reaches a value close to the dissolution battery voltage, so the discharge capacity may be increased.

Furthermore, by setting the lower limit battery voltage at a value higher than (B−C) V, as described above, even when a decrease in capacity of the battery (negative electrode) proceeds (at least until the capacity decreases by half), it is possible to prevent the battery voltage from decreasing to the dissolution battery voltage, that is, to prevent the negative electrode potential from increasing to the negative electrode dissolution potential C (V). Thus, even when a decrease in capacity of the battery (negative electrode) proceeds, it is possible to suppress a dissolution of the negative electrode current collector to prevent the service life of the battery from shortening because of an internal short circuit.

In addition, the negative electrode active material of the lithium ion secondary battery may be, for example, a carbon-based material. The carbon-based material may be a natural graphite-based material, an artificial graphite-based material (mesocarbon microbead, or the like), a non-graphitizable carbon-based material, or the like.

Furthermore, in the above lithium ion secondary battery system, the lithium ion secondary battery system may be mounted on a hybrid vehicle, and the control means may perform control to charge the lithium ion secondary battery with the predetermined quantity of electricity when the hybrid vehicle is stopped.

In the lithium ion secondary battery system according to the second aspect of the invention, when the hybrid vehicle is stopped, and when the battery voltage of the lithium ion secondary battery has decreased to the lower limit battery voltage, the lithium ion secondary battery is forcibly charged with a predetermined quantity of electricity. By so doing, even when the hybrid vehicle is stopped, it is possible to prevent the battery voltage of the lithium ion secondary battery from reaching the lower limit battery voltage (that is, to prevent the negative electrode potential from reaching the negative electrode dissolution potential) to thereby suppress a dissolution of the negative electrode current collector. Thus, it is possible to prevent the service life of the battery from shortening because of an internal short circuit. In addition, it is possible to allow an operating electronic equipment to operate continuously.

Furthermore, in the above lithium ion secondary battery system, the predetermined quantity of electricity may correspond to 5% or above of a quantity of electricity that is discharged from the lithium ion secondary battery when the battery voltage of the lithium ion secondary battery decreases from the upper limit battery voltage to the lower limit battery voltage.

By charging the quantity of electricity corresponding to 5% or above the quantity of electricity discharged from the lithium ion secondary battery when the battery voltage of the lithium ion secondary battery decreases from the upper limit battery voltage to the lower limit battery voltage, it is possible to keep the battery voltage far away from the lower limit battery voltage. By so doing, it is possible to keep the negative electrode potential far away from the negative electrode dissolution potential C. Thus, it is possible to decrease the possibility that the negative electrode potential approaches the negative electrode dissolution potential C.

Furthermore, in the above lithium ion secondary battery system, the predetermined quantity of electricity may correspond to 5% or above and 10% or below of a quantity of electricity that is discharged from the lithium ion secondary battery when the battery voltage of the lithium ion secondary battery decreases from the upper limit battery voltage to the lower limit battery voltage.

The quantity of electricity with which the battery is charged is set at a quantity of electricity corresponding to 5% or above and 10% or below of the quantity of electricity discharged from the lithium ion secondary battery when the battery voltage of the lithium ion secondary battery decreases from the upper limit battery voltage to the lower limit battery voltage. Thus, it is possible to suppress a decrease in energy efficiency while decreasing the possibility that the negative electrode potential approaches the negative electrode dissolution potential C.

Furthermore, any of the above lithium ion secondary battery systems may include stop determination means that determines whether the hybrid vehicle is stopped; voltage detection instructing means that, when it is determined that the hybrid vehicle is stopped, issues an instruction for detecting the battery voltage of the lithium ion secondary battery when the hybrid vehicle is stopped; and lower limit determination means that determines whether the battery voltage detected through the above instruction has decreased to the lower limit battery voltage, wherein, when the lower limit determination means determines that the detected battery voltage has decreased to the lower limit battery voltage, the control means may perform control to charge the lithium ion secondary battery with the predetermined quantity of electricity.

In the lithium ion secondary battery system according to the second aspect of the invention, it is determined whether the battery voltage has decreased to the lower limit battery voltage on the basis of the battery voltage detected at the time when the hybrid vehicle is stopped. By so doing, it is possible to increase the accuracy of determination as to whether the battery voltage has decreased to the lower limit battery voltage. Furthermore, the lithium ion secondary battery is charged on the basis of the above accurate determination result, so it is possible to prevent the negative electrode potential from increasing to the negative electrode dissolution potential C (V).

Furthermore, any of the above lithium ion secondary battery systems may include abnormality determination means that determines that the lithium ion secondary battery is abnormal when the battery voltage of the lithium ion secondary battery after being charged with the predetermined quantity of electricity is not higher than the lower limit battery voltage.

When the lithium ion secondary battery is normal (serviceable), the battery voltage after being charged with the predetermined quantity of electricity should be higher than the lower limit battery voltage. Thus, in the lithium ion secondary battery system according to the second aspect of the invention, when there is an abnormality (for example, internal short circuit) in the lithium ion secondary battery, it is possible to determine the abnormality.

Furthermore, in any of the above lithium ion secondary battery systems, the positive electrode active material may be a chemical compound expressed by $LiM1_{(1-x)}M2_xPO_4$ (where M1 is any one of Fe or Mn, M2 is at least any one of Mn, Cr, Co, Cu, Ni, V, Mo, Ti, Zn, Al, Ga, B or Nb (provided that Mn is excluded when M1 is Mn), and $0 \leq X \leq 0.1$).

With the lithium ion secondary battery system according to the second aspect of the invention, because the above positive electrode active material is used, as described above, even when a decrease in capacity of the battery (negative electrode) proceeds, it is possible to prevent the battery voltage from decreasing to the dissolution battery voltage, that is, to prevent the negative electrode potential from increasing to the negative electrode dissolution potential C (V). Thus, even when a decrease in capacity of the battery (negative electrode) proceeds, it is possible to suppress a dissolution of the negative electrode current collector to prevent the service life of the battery from shortening because of an internal short circuit.

Furthermore, in the lithium ion secondary battery system, the positive electrode active material may be $LiFePO_4$, the negative electrode current collector may be made of copper, and the lower limit battery voltage may be set at a value that falls within a range higher than 2.2 V and lower than or equal to 2.4 V.

When $LiFePO_4$ is used as the positive electrode active material, the maximum value B of the positive electrode potential of the flat portion is about 3.4 V. When the negative electrode current collector made of copper is used, the negative electrode dissolution potential C (negative electrode potential at which the negative electrode current collector dissolves) is about 1.2 V. Thus, the dissolution battery voltage (battery voltage when the negative electrode potential reaches the negative electrode dissolution potential C) is about 2.2 V (=3.4−1.2). Thus, by setting the lower limit battery voltage at a value (for example, 2.3 V) that falls within a range higher than 2.2 V and lower than or equal to 2.4 V, even when the hybrid vehicle is stopped, it is possible to prevent the negative electrode potential from increasing to 1.2 V (negative electrode dissolution potential C).

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
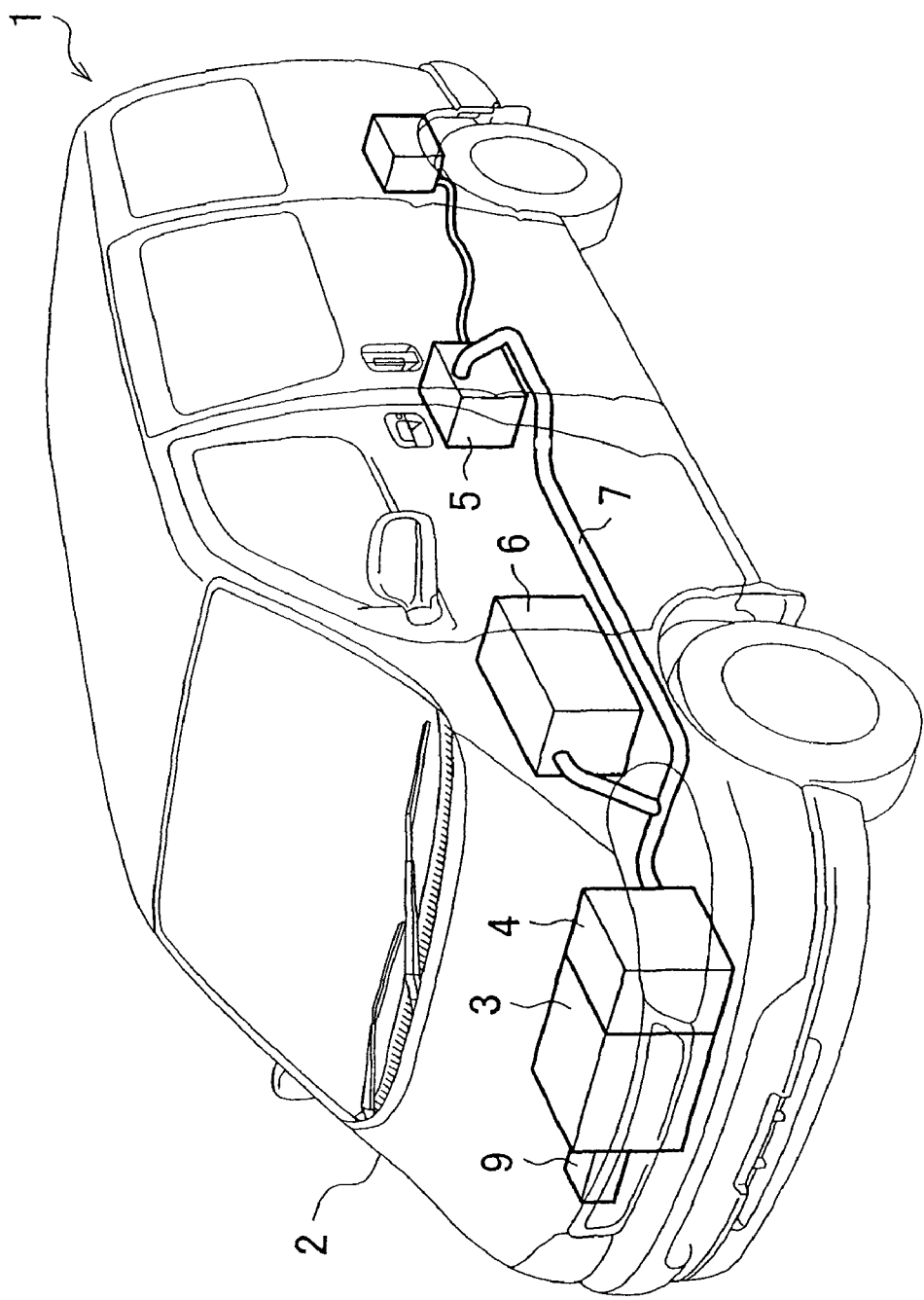
FIG. 1 is a schematic view of a hybrid vehicle.

Next, an embodiment of the invention will be described with reference to the accompanying drawings. As shown in FIG. 1, a hybrid vehicle 1 includes a vehicle body 2, an engine 3, a front motor 4, a rear motor 5, a lithium ion secondary battery system 6, a cable 7 and an alternator 9. The hybrid vehicle 1 is driven by the engine 3, the front motor 4 and the rear motor 5. Specifically, the hybrid vehicle 1 uses the lithium ion secondary battery system 6 as a driving source for the front motor 4 and the rear motor 5, and is able to run using the engine 3, the front motor 4 and the rear motor 5.

Figure 2:
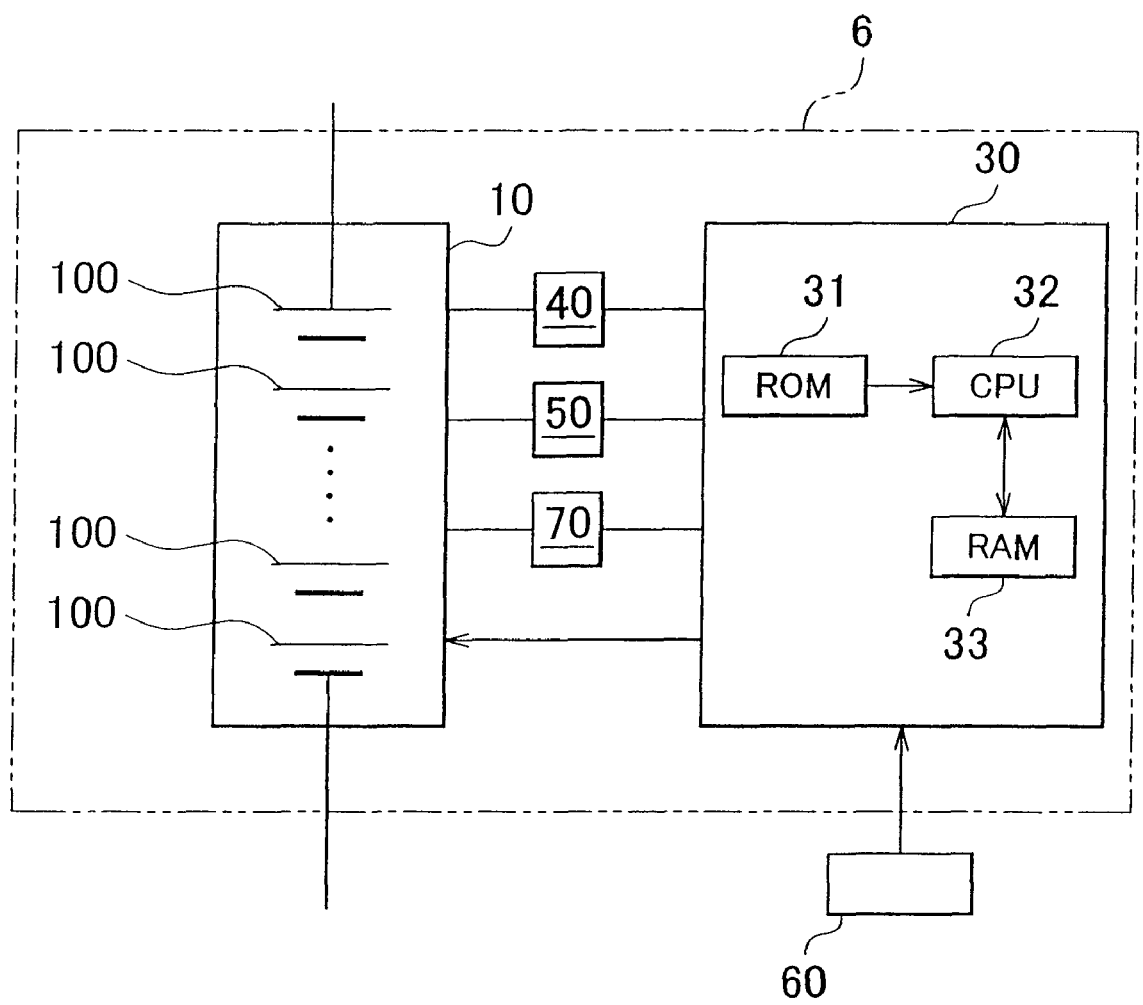
FIG. 2 is a schematic view of a lithium ion secondary battery system.

The lithium ion secondary battery system 6 is assembled to the vehicle body 2 of the hybrid vehicle 1, and is connected to the front motor 4 and the rear motor 5 by the cable 7. As shown in FIG. 2, the lithium ion secondary battery system 6 includes a battery pack 10, voltage detecting means 40, current detecting means 50, temperature detecting means 70 and a battery controller 30. The battery pack 10 electrically connects a plurality of lithium ion secondary batteries 100 (electric cells) in series with one another.

The voltage detecting means 40 detects a battery voltage (voltage between terminals) of each of the secondary batteries 100 that constitute the battery pack 10. The current detecting means 50 detects an electric current that flows through the secondary batteries 100 of the battery pack 10. The temperature detecting means 70 detects a temperature of each of the secondary batteries 100 of the battery pack 10 and an ambient temperature around the battery pack 10.

The battery controller 30 has a ROM 31, a CPU 32, a RAM 33, and the like. The battery controller 30 controls charge and discharge of the lithium ion secondary batteries 100 on the basis of a battery voltage of each lithium ion secondary battery 100, detected by the voltage detecting means 40, when the hybrid vehicle 1 is running. Specifically, the battery controller 30 prestores a discharge lower limit battery voltage (2.3 V in the present embodiment) and an upper limit battery voltage (4.0 V in the present embodiment) in the ROM 31, and, when the hybrid vehicle 1 is running, controls charge and discharge of the lithium ion secondary batteries 100 so that the battery voltage of each of the lithium ion secondary batteries 100 of the battery pack 10 does not fall outside the range between the upper limit battery voltage and the lower limit battery voltage.

Furthermore, the battery controller 30 determines whether the hybrid vehicle 1 is stopped. Specifically, the battery controller 30 determines whether the hybrid vehicle 1 is not running but is runnable and the engine is not operating (stopped) on the basis of a signal transmitted from a control unit 60 that governs control over the hybrid vehicle 1. When the lithium ion secondary battery system 6 is started up and a shift position is "N position" or "P position", the control unit 60 determines that the hybrid vehicle 1 is not running, and transmits a non-running signal to the battery controller 30.

In addition, when a system main relay (SMR) is turned on (connected), the control unit 60 determines that the hybrid vehicle 1 is runnable, and transmits a runnable signal to the battery controller 30. The SMR switches between supply and interruption of electric power from the battery pack 10 to various units of the vehicle (front motor 4, rear motor 5, and the like). In addition, the control unit 60 determines that the engine 3 is not operating when the engine rotational speed is approximately zero, and transmits an engine stopped signal indicating that the engine 3 is stopped to the battery controller 30. Thus, the battery controller 30 determines that the hybrid vehicle 1 is stopped when the battery controller 30 detects the non-running signal, the runnable signal and the engine stopped signal.

Furthermore, when the battery controller 30 according to the present embodiment determines that the hybrid vehicle 1 is stopped, the battery controller 30 detects a battery voltage of each lithium ion secondary battery 100 using the voltage detecting means 40, and determines whether the battery voltages of the lithium ion secondary batteries 100 have not reached the lower limit battery voltage (2.3 V in the present embodiment). Specifically, when it is determined that the hybrid vehicle 1 is stopped, the battery controller 30 instructs the voltage detecting means 40 to detect a battery voltage of each lithium ion secondary battery 100 when the hybrid vehicle 1 is stopped. After that, the battery controller 30 determines whether any of the battery voltages detected by the voltage detecting means 40 has reached the lower limit battery voltage.

Incidentally, the battery voltage is stable when the hybrid vehicle 1 is stopped than when the hybrid vehicle 1 is running. In the present embodiment, as described above, it is determined whether the battery voltage decreases to the lower limit battery voltage on the basis of the battery voltage detected at the time when the hybrid vehicle 1 is stopped, so it is possible to increase the accuracy of determination.

Furthermore, when the battery controller 30 determines that any of the battery voltages detected by the voltage detecting means 40 has reached the lower limit battery voltage, the battery controller 30 instructs the engine 3 to start up. By so doing, the engine 3 enters an operating state (idling state), and the alternator 9 is driven accordingly. By supplying electric power generated by the alternator 9 to the lithium ion secondary batteries 100 of the battery pack 10, it is possible to charge the lithium ion secondary batteries 100 with a predetermined quantity of electricity.

Furthermore, the battery controller 30 charges the lithium ion secondary batteries 100 with the predetermined quantity of electricity, and then instructs the voltage detecting means 40 to detect a battery voltage of each lithium ion secondary battery 100. Moreover, the battery controller 30 determines whether all the battery voltages detected by the voltage detecting means 40 are higher than the lower limit battery voltage. When there is any lithium ion secondary battery 100 of which the battery voltage is higher than the lower limit battery voltage, the battery controller 30 determines that the corresponding lithium ion secondary battery 100 is abnormal. This is because, when the lithium ion secondary battery 100 is normal (serviceable), the battery voltage after being charged should be higher than the lower limit battery voltage (see FIG. 6). Thus, in the lithium ion secondary battery system 6 according to the present embodiment, when there is an abnormality (for example, internal short circuit) in any of the lithium ion secondary batteries 100, it is possible to appropriately determine the abnormality.

Note that, in the present embodiment, the battery controller 30 may be regarded as control means, stop determination means, voltage detection instructing means, lower limit determination means and abnormality determination means.

Figure 3:
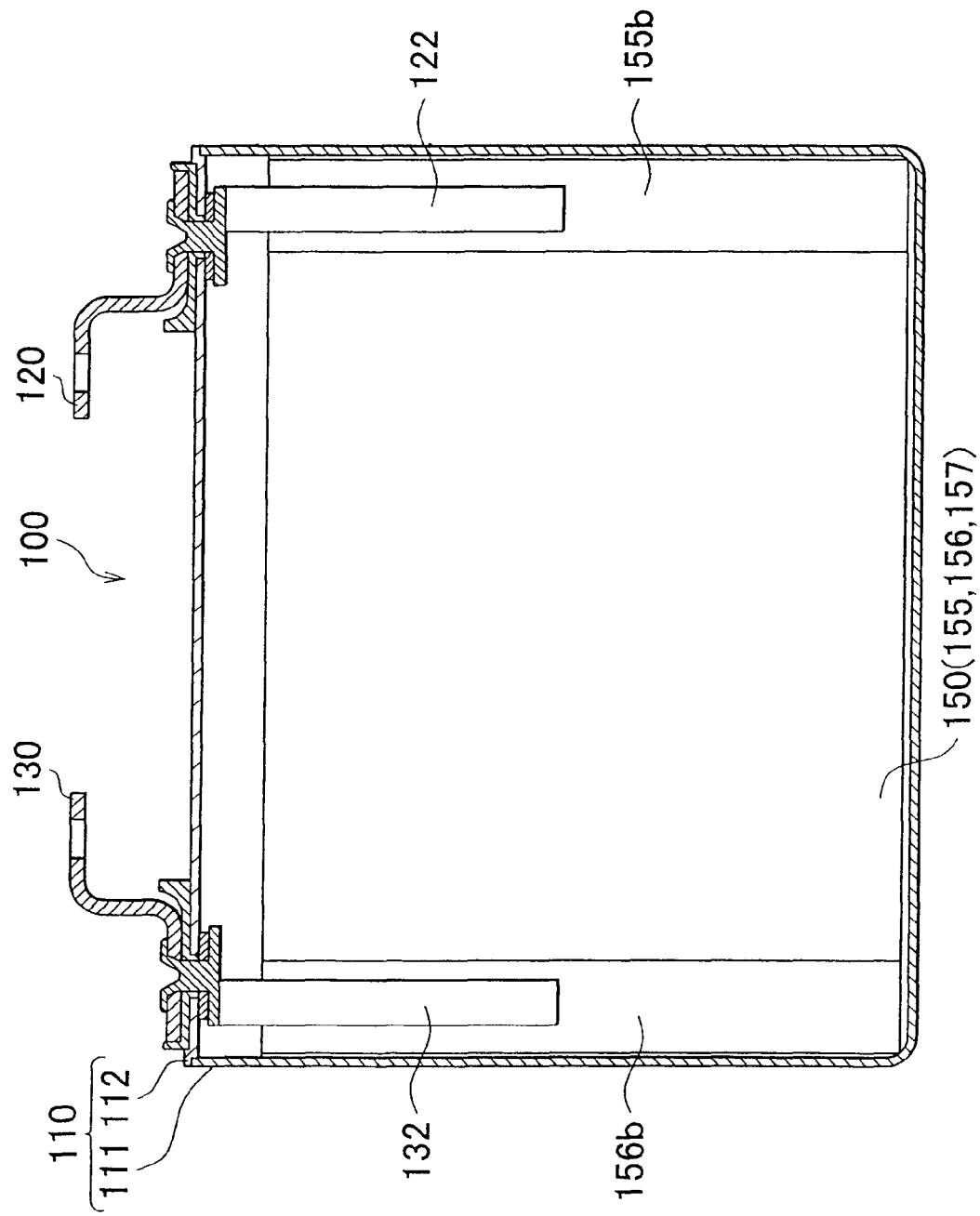
FIG. 3 is a cross-sectional view of a lithium ion secondary battery.

Next, the lithium ion secondary battery 100 will be described with reference to the accompanying drawings. As shown in FIG. 3, the lithium ion secondary battery 100 is a rectangular closed lithium ion secondary battery, and includes a rectangular battery case 110, a positive electrode terminal 120 and a negative electrode terminal 130. The battery case 110 is made of metal. The battery case 110 has a rectangular accommodating portion 111 and a metal lid portion 112. The rectangular accommodating portion 111 forms a rectangular-parallelepiped accommodating space. The battery case 110 (rectangular accommodating portion 111) accommodates an electrode element 150, a positive electrode current collector 122, a negative electrode current collector 132, and the like.

Figure 4:
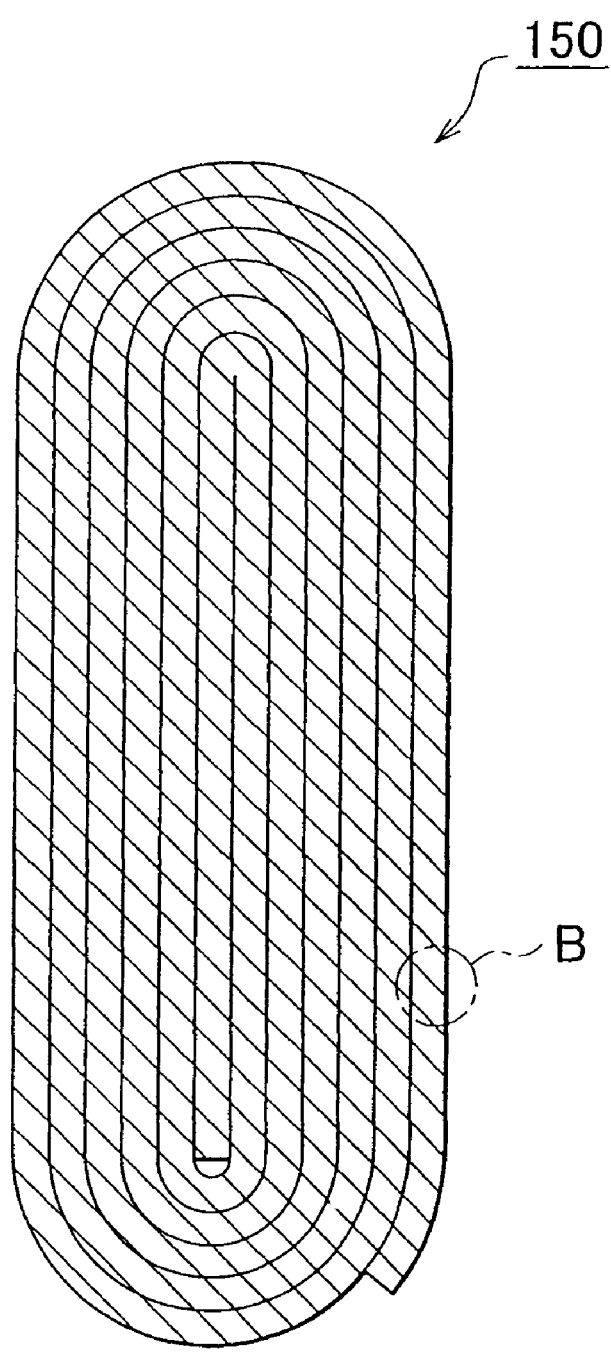
FIG. 4 is a cross-sectional view of an electrode element.

The electrode element 150 has an oblong cross-sectional shape. The electrode element 150 is a flat rolled element that is formed of a sheet-like positive electrode 155, negative electrode 156 and separator 157 rolled together (see FIG. 4 and FIG. 5). The positive electrode 155 has a positive electrode current collector 151 and a positive electrode composite material 152. The positive electrode current collector 151 is made of aluminum foil. The positive electrode composite material 152 is coated on the surface of the positive electrode current collector 151. The negative electrode 156 has a negative electrode current collector 158 and a negative electrode composite material 159. The negative electrode current collector 158 is made of copper foil. The negative electrode composite material 159 is coated on the surface of the negative electrode current collector 158.

The electrode element 150 has a positive electrode rolled portion 155$b$ and a negative electrode rolled portion 156$b$. The positive electrode rolled portion 155$b$ is located at one end (right end in FIG. 3) in the axial direction (transverse direction in FIG. 3). Only part of the positive electrode current collector 151 spirally overlaps in the positive electrode rolled portion 155$b$. The negative electrode rolled portion 156$b$ is located at the other end in the axial direction (left end in FIG. 3). Only part of the negative electrode current collector 158 spirally overlaps in the negative electrode rolled portion 156$b$.

Figure 5:
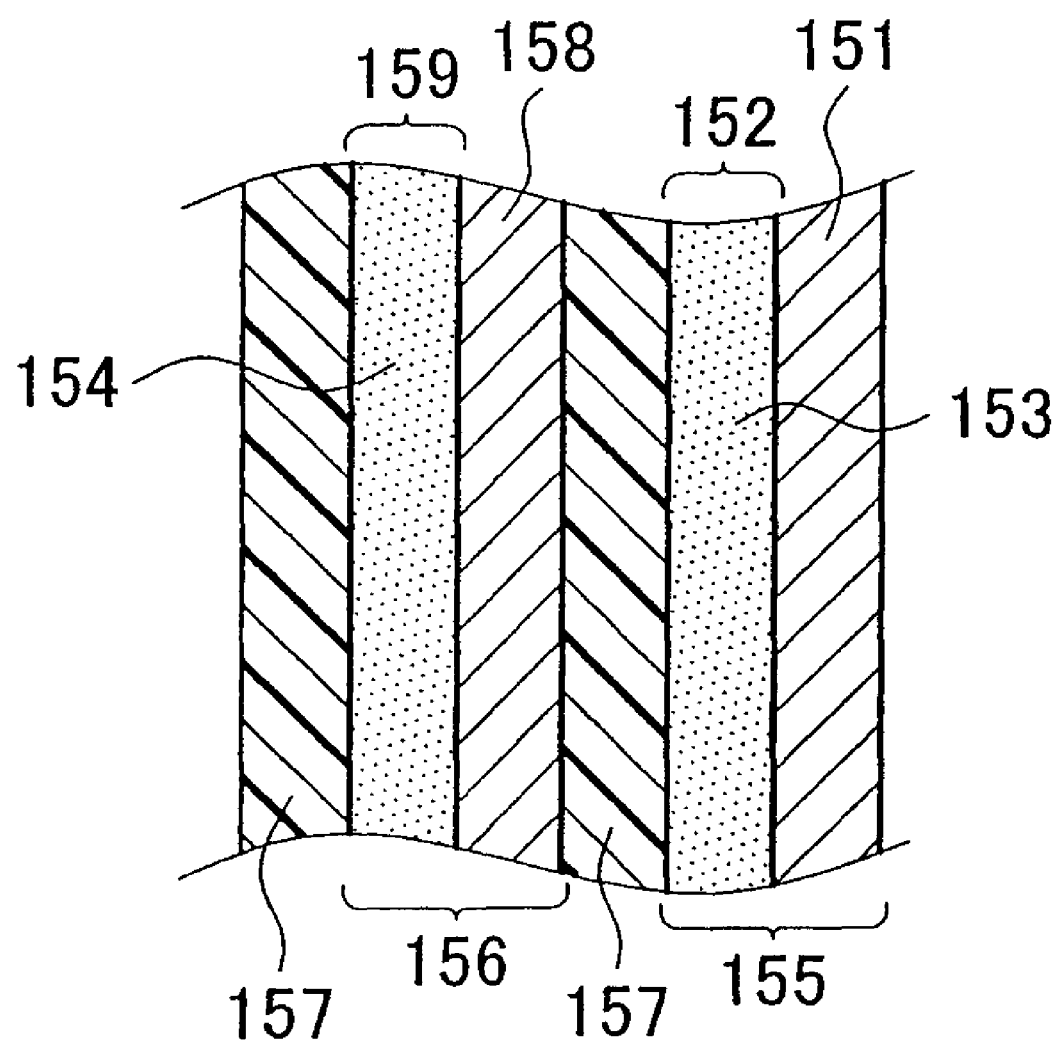
FIG. 5 is a partially enlarged cross-sectional view of the electrode element, and is an enlarged view of a portion indicated by B in FIG. 4.

The positive electrode composite material 152 that includes a positive electrode active material 153 is coated on a portion of the positive electrode 155 other than the positive electrode rolled portion 155$b$ (see FIG. 5). In addition, the negative electrode composite material 159 that includes a negative electrode active material 154 is coated on a portion of the negative electrode 156 other than the negative electrode rolled portion 156$b$ (see FIG. 5). The positive electrode rolled portion 155$b$ is electrically connected to the positive electrode terminal 120 via the positive electrode current collector 122. The negative electrode rolled portion 156$b$ is electrically connected to the negative electrode terminal 130 via the negative electrode current collector 132.

In the present embodiment, a chemical compound expressed by $LiFePO_4$ is used as the positive electrode active material 153. The chemical compound expressed by $LiFePO_4$ is an active material that undergoes charge and discharge in a two-phase coexistence state, and a charge/discharge reaction occurs in a state where two types of crystals having different crystal structures coexist. In addition, a natural graphite-based carbon material is used as the negative electrode active material 154. Specifically, the natural graphite-based material has an average particle size of 20 μm, a lattice constant CO of 0.67 nm, a crystallite size Lc of 27 nm and a graphitization degree of 0.9 or above.

In addition, a polypropylene-polyethylene-polypropylene three-layer composite porous sheet is used as the separator 157. A lithium phosphate hexafluoride ($LiPF_6$) is dissolved at the rate of 1 mol/l into a solution that mixes ethylene carbonate (EC) with diethyl carbonate (DEC) with a ratio of 4 to 6 (volume ratio) as a nonaqueous electrolytic solution.

In regard to the lithium ion secondary battery 100, a discharge positive electrode potential curve K1 and a discharge negative electrode potential curve K2 were acquired through a known method. The discharge positive electrode potential curve K1 represents the behavior of a positive electrode potential during discharging. The discharge negative electrode potential curve K2 represents the behavior of a negative electrode potential during discharging. Specifically, first, a constant current charge was performed at an electric current of 1/5 C until the battery voltage reached the upper limit battery voltage (4.0 V). After that, a constant voltage charge was performed while maintaining the battery voltage at the upper limit battery voltage. Then, when the electric current decreased to a tenth of the electric current when the constant voltage charge was started, the charge was terminated.

Figure 6:
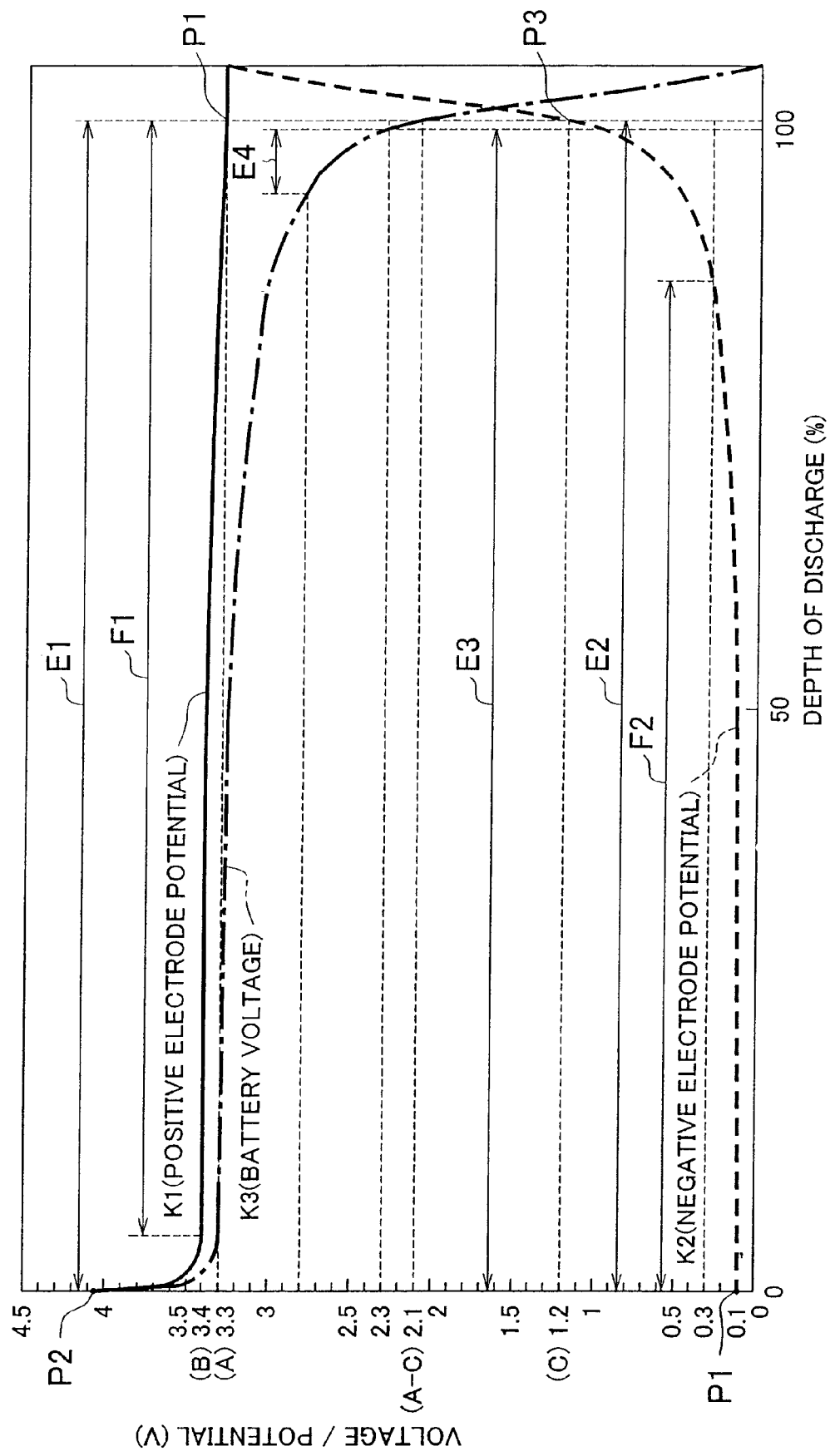
FIG. 6 is a discharge characteristic graph of the lithium ion secondary battery (before capacity degradation)

Subsequently, a reference electrode made of a columnar metal lithium was inserted inside the lithium ion secondary battery 100, and then the secondary battery 100 was discharged at a constant current of 1/5 C. At this time, a positive electrode potential (vs. Li/Li+) and a negative electrode potential (vs. Li/Li+) were measured at predetermined time intervals, and then the discharge positive electrode potential curve K1 and the discharge negative electrode potential curve K2 were drawn up on the basis of the measurement results. The obtained discharge positive electrode potential curve K1 and discharge negative electrode potential curve K2 are shown in FIG. 6. Note that FIG. 6 shows the discharge positive electrode potential curve K1 in solid line, and shows the discharge negative electrode potential curve K2 in broken line.

Note that 1C indicates an electric current at which the positive electrode active material 153 ($LiFePO_4$) of the lithium ion secondary battery 100 is able to charge (or discharge) a theoretical electric capacity to which the positive electrode active material 153 is theoretically able to fully store electricity (the lithium ion secondary battery 100 is of a positive electrode restriction type, so this corresponds to the battery theoretical capacity) for an hour.

In addition, a value obtained by subtracting the negative electrode potential (vs. Li/Li+) from the positive electrode potential (vs. Li/Li+) was acquired as the battery voltage, and a discharge battery voltage curve K3 was drawn up on the basis of these battery voltages. The discharge battery voltage curve K3 represents the behavior of the battery voltage during discharging. The discharge battery voltage curve K3 is indicated by the alternate long and short dashed lines in FIG. 6. Note that in FIG. 6, a depth of discharge is 0% when the battery voltage is the upper limit battery voltage (4.0 V), and a depth of discharge is 100% when the battery voltage has reached the lower limit battery voltage (2.3 V).

Incidentally, in the lithium ion secondary battery 100 according to the present embodiment, a copper foil is used as the negative electrode current collector 158. Thus, as the potential of the negative electrode increases to about 1.2 V, copper that composes the negative electrode current collector 158 dissolves. After that, the dissolved copper precipitates to cause a short circuit (internal short circuit) between the positive and negative electrodes. This may possibly shorten the service life. Here, the negative electrode potential, at which the negative electrode current collector 158 dissolves, is termed a negative electrode dissolution potential (1.2 V in the present embodiment). In addition, a battery voltage of the lithium ion secondary battery at the time when the negative electrode potential has reached the negative electrode dissolution potential is termed a dissolution battery voltage (2.1 V in the present embodiment).

In FIG. 6, among points located on the discharge positive electrode potential curve K1, a positive electrode dissolution corresponding point P1 indicates a positive electrode potential when the negative electrode potential is the negative electrode dissolution potential (1.2 V), and a positive electrode upper limit corresponding point P2 indicates a positive electrode potential when the battery voltage is the upper limit battery voltage (4.0 V in the present embodiment). At this time, as shown in FIG. 6, the discharge positive electrode potential curve K1 has a flat portion F1, at which a variation width of the positive electrode potential is within 0.1 V (in the present embodiment, the positive electrode potential falls within the range of 3.3 V to 3.4 V), over 50% or above (about 95% in the present embodiment) of the range starting from the positive electrode dissolution corresponding point P1 to the positive electrode upper limit corresponding point P2 within an electricity quantity range E1 from the positive electrode upper limit corresponding point P2 to the positive electrode dissolution corresponding point P1.

In addition, as shown in FIG. 6, when the lithium ion secondary battery 100 is discharged so that the battery voltage of the lithium ion secondary battery 100 decreases from the upper limit battery voltage to the dissolution battery voltage, the negative electrode potential, in the late stage of discharging, increases as the battery voltage approaches the negative electrode dissolution potential, and then negative electrode potential reaches the negative electrode dissolution potential. Specifically, among points located on the discharge negative electrode potential curve K2, a negative electrode dissolution corresponding point P3 indicates the negative electrode dissolution potential (1.2 V), and a negative electrode upper limit corresponding point P4 indicates the negative electrode potential when the battery voltage is the upper limit battery voltage (4.0 V in the present embodiment). At this time, as shown in FIG. 6, the discharge negative electrode potential curve K2 just increases by 0.2 V in negative electrode potential (in the present embodiment, the negative electrode potential increases from 0.1 V to 0.3 V) over about 85% of the range (referred to as flat portion F2) starting from the negative electrode upper limit corresponding point P4 to the negative electrode dissolution corresponding point P3 within an electricity quantity range E2 from the negative electrode upper limit corresponding point P4 to the negative electrode dissolution corresponding point P3. However, in the late stage of discharging beyond the flat portion F2, the negative electrode potential steeply increases as the negative electrode potential approaches the negative electrode dissolution potential (1.2 V), and then the negative electrode potential reaches the negative electrode dissolution potential (1.2 V).

Here, when the maximum value of the positive electrode potential of the flat portion F1 is B (3.4 V in the present embodiment) and the negative electrode dissolution potential is C (1.2 V in the present embodiment), the lower limit battery voltage is set at a value that falls within the range higher than (B−C) V and lower than or equal to (B−C+0.2) V in the present embodiment. Specifically, in the present embodiment, B is 3.4 and C is 1.2, whereas the lower limit battery voltage is set at 2.3 V, so the lower limit battery voltage is B−C+0.1.

Here, the battery voltage (dissolution battery voltage) of the lithium ion secondary battery 100, indicated at the time when the negative electrode potential has reached the negative electrode dissolution potential C (V), is (A−C) V that is obtained by subtracting the negative electrode dissolution potential C (V) from the positive electrode potential (referred to as positive electrode dissolution potential A) (V) at that time. The positive electrode dissolution potential A (V) is a value indicated at an end point (positive electrode dissolution corresponding point P1) of the flat portion F1 of the discharge positive electrode potential curve K1, that is, (B−0.1) V (see FIG. 6). Thus, in the present embodiment, the dissolution battery voltage is (B−0.1−C) V.

In the lithium ion secondary battery system 6 according to the present embodiment, the lower limit battery voltage is set at a value higher than the dissolution battery voltage (B−0.1−C) V (B−C+0.1 in the present embodiment), and, when the battery voltage of any of the lithium ion secondary batteries 100 decreases to the lower limit battery voltage, the lithium ion secondary battery 100 is charged with a predetermined quantity of electricity. Therefore, it is possible to prevent the battery voltage from decreasing to the dissolution battery voltage, that is, to prevent the negative electrode potential from increasing to the negative electrode dissolution potential C (V). Specifically, in the present embodiment, it is possible to prevent a situation that the negative electrode potential is higher than or equal to 1.0 V (see FIG. 6). By so doing, it is possible to suppress a dissolution of the negative electrode current collector to prevent the service life of the battery from shortening because of an internal short circuit.

In addition, the lower limit battery voltage is set at a value lower than or equal to (B−C+0.2) V. Specifically, the lower limit battery voltage is set at (B−C+0.1) V. Thus, the difference between the lower limit battery voltage and the dissolution battery voltage is (B−C+0.1)−(B−0.1−C)=0.2 V. That is, the lower limit battery voltage is set at a value exceedingly close to the dissolution battery voltage so that the difference between the lower limit battery voltage and the dissolution battery voltage is 0.2 V. By so doing, it is possible to discharge the lithium ion secondary battery 100 until the battery voltage reaches a value close to the dissolution battery voltage, so the discharge capacity may be increased (see FIG. 6).

Incidentally, in the related art, if it is configured to be dischargeable until the battery voltage reaches a value close to the dissolution battery voltage, there is a possibility that, when the hybrid vehicle is stopped, the battery voltage may reach the dissolution battery voltage (that is, the negative electrode potential may reach the negative electrode dissolution potential) and may allow a dissolution of the negative electrode current collector to proceed. Specifically, even when the hybrid vehicle is stopped, electric power of the lithium ion secondary battery is consumed by, for example, an electronic equipment (a battery controller, an air conditioner, an audio equipment, and the like) mounted on the vehicle. Therefore, when the hybrid vehicle is continuously stopped for a long period of time in a state where the negative electrode potential has reached a value close to the dissolution potential of the negative electrode current collector, there is a possibility that the negative electrode potential increases with a reduction in the amount of electric charge stored in the lithium ion secondary battery, and, as a result, the negative electrode potential reaches the negative electrode dissolution potential.

In contrast, in the present embodiment, as described above, when the hybrid vehicle 1 is stopped, any of the lithium ion secondary batteries 100, of which the battery voltage has decreased to the lower limit battery voltage, is forcibly charged with a predetermined quantity of electricity. By so doing, even when the hybrid vehicle 1 is stopped, it is possible to prevent the battery voltage of each lithium ion secondary battery 100 from reaching the dissolution battery voltage (that is, to prevent the negative electrode potential from reaching the negative electrode dissolution potential C) to thereby suppress a dissolution of the negative electrode current collector 158. Thus, it is possible to prevent the service life of the battery from shortening because of an internal short circuit. In addition, it is possible to allow an operating electronic equipment to operate continuously.

In addition, if the quantity of electricity with which the lithium ion secondary battery 100 is charged is small, the battery voltage decreases to the lower limit battery voltage again for a short period of time. Because the lower limit battery voltage is a value exceedingly close to the dissolution battery voltage at which the negative electrode current collector 158 dissolves, the battery voltage may be set so as not to approach the lower limit battery voltage.

In consideration of the above, in the present embodiment, when the battery voltage of any of the lithium ion secondary batteries 100 has decreased to the lower limit battery voltage, a quantity of electricity E4 corresponding to 5% of a quantity of electricity E3 (in FIG. 6, a quantity of electricity discharged from the depth of discharge 0% to the depth of discharge 100%) discharged from the lithium ion secondary battery 100 when the battery voltage of the lithium ion secondary battery 100 decreases from the upper limit battery voltage to the lower limit battery voltage. By charging a quantity of electricity corresponding to 5% or above of the quantity of electricity E3, it is possible to keep the battery voltage far away from the lower limit battery voltage. By so doing, it is possible to keep the negative electrode potential far away from the negative electrode dissolution potential C. Thus, it is possible to decrease the possibility that the negative electrode potential approaches the negative electrode dissolution potential C.

On the other hand, as a quantity of electricity with which the lithium ion secondary battery 100 is charged is increased, the possibility that the negative electrode potential approaches the negative electrode dissolution potential C may be decreased. However, an excessive charge deteriorates energy efficiency (for example, when the engine is operated for power generation to charge the battery, fuel is wastefully consumed). In contrast, in the present embodiment, the quantity of electricity with which the battery is charged is set at a quantity of electricity corresponding to 5% or above and 10% or below of the quantity of electricity E3 (specifically, 5%). Thus, it is possible to suppress a decrease in energy efficiency while decreasing the possibility that the negative electrode potential approaches the negative electrode dissolution potential C.

Note that the quantity of electricity with which the lithium ion secondary battery 100 is charged may be calculated by accumulating the electric current detected by the current detecting means 50. Thus, the quantity of electricity E4 corresponding to 5% of the quantity of electricity E3 is prestored in the ROM 31 of the battery controller 30, and the battery controller 30, after a charge is started, accumulates the electric current detected by the current detecting means 50, and stops the charge when the electric current accumulated value has reached the quantity of electricity E4. By so doing, it is possible to charge each of the lithium ion secondary batteries 100 with the quantity of electricity E4 corresponding to 5% of the quantity of electricity E3.

Figure 7:
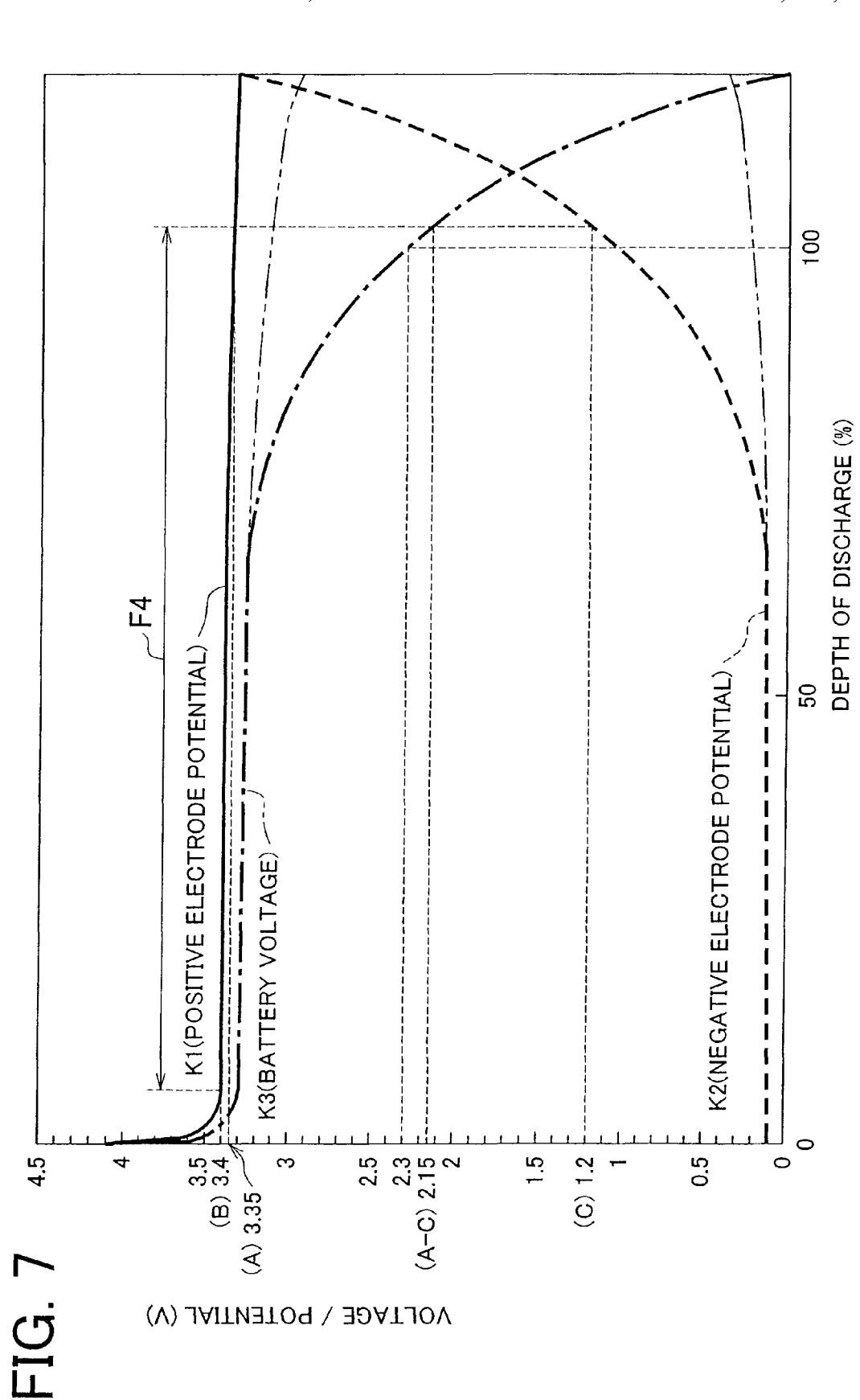
FIG. 7 is a discharge characteristic graph of the lithium ion secondary battery (after capacity degradation)

In addition, the capacity of each lithium ion secondary battery 100 may degrade with use. However, this is mainly caused by degradation (decrease in capacity) of the negative electrode 156 (negative electrode active material 154). This is because the positive electrode active material 153 (LiFePO$_4$) is exceedingly resistant to degradation (decrease in capacity). Here, FIG. 7 shows a discharge positive electrode potential curve, a discharge negative electrode potential curve and a discharge battery voltage curve after the capacity of the lithium ion secondary battery 100 has degraded. Note that in FIG. 7, the discharge negative electrode potential curve and the discharge battery voltage curve before a decrease in capacity are indicated by the alternate long and two short dashed lines.

As shown in FIG. 7, even when the capacity of the battery decreases with use, the discharge positive electrode potential curve also has the flat portion F4. This is because, as shown in FIG. 6, in the lithium ion secondary battery 100 before the capacity of the negative electrode 156 decreases, the flat portion F1 covers 50% or above (about 95% in the present embodiment) of the range starting from the positive electrode dissolution corresponding point P1 to the positive electrode upper limit corresponding point P2 within the electricity quantity range E1 from the positive electrode upper limit corresponding point P2 to the positive electrode dissolution corresponding point P1 in the discharge positive electrode potential curve K1.

Moreover, the positive electrode potential of the flat portion F4 of the discharge positive electrode potential curve is almost the same as the positive electrode potential of the flat portion F1 before a decrease in capacity (see FIG. 6). In addition, the negative electrode dissolution potential C is determined on the basis of a component (copper) that composes the negative electrode current collector 158, so the negative electrode dissolution potential C remains almost unchanged even when a decrease in capacity proceeds with use.

Thus, as shown in FIG. 7, even when the capacity decreases with use, the positive electrode potential (positive electrode dissolution potential A) at the time when the negative electrode potential has reached the negative electrode dissolution potential C (1.2 V) is lower than or equal to the maximum value B (3.4 V) of the positive electrode potential of the flat portion F1 (specifically, 3.35 V). Then, the dissolution battery voltage is lower than or equal to (B−C) V (=3.4−1.2=2.2 V) (specifically, 2.15 V).

In consideration of the above battery characteristics, in the present embodiment, as described above, the lower limit battery voltage is set at a value higher than (B−C) V (=2.2 V) (specifically, B−C+0.1=2.3 V), and, when the battery voltage has decreased to the lower limit battery voltage, the lithium ion secondary battery 100 is forcibly charged with the predetermined quantity of electricity. By so doing, even when a decrease in capacity of the lithium ion secondary battery 100 (negative electrode 156) proceeds, it is possible to prevent the battery voltage from decreasing to the dissolution battery voltage, that is, to prevent the negative electrode potential from increasing to the negative electrode dissolution potential C (V). Specifically, in the present embodiment, it is possible to prevent a situation that the negative electrode potential is higher than or equal to 1.0 V (see FIG. 7). Thus, even when a decrease in capacity of the lithium ion secondary battery 100 (negative electrode 156) proceeds, it is possible to suppress a dissolution of the negative electrode current collector 158 to prevent the service life of the battery from shortening because of an internal short circuit.

Thus, by charging the battery in such a manner that the lower limit battery voltage is set at a value higher than (B−C) V, not only before the capacity of each lithium ion secondary battery decreases (for example, in an initial state) but also the capacity of each lithium ion secondary battery has decreased, it is possible to suppress a dissolution of the negative electrode current collector 158 to prevent the service life of the battery from shortening because of an internal short circuit.

Figure 8:
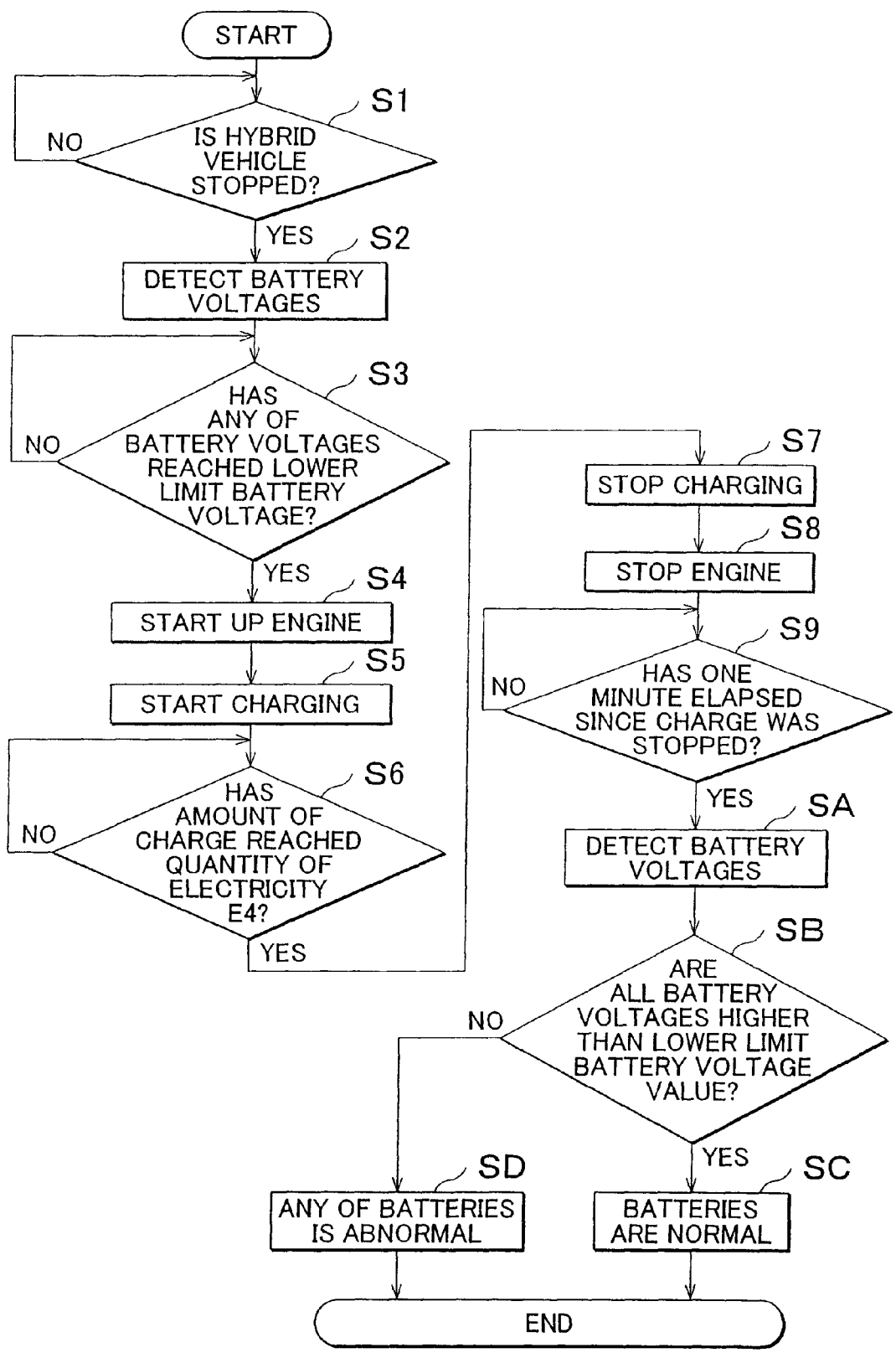
FIG. 8 is a flowchart that shows the flow of a control method for lithium ion secondary batteries.

Next, a control method for the lithium ion secondary batteries 100 will be described. FIG. 8 is a flowchart that shows the flow of the control method for the lithium ion secondary batteries according to the present embodiment. First, in step S1, the battery controller 30 determines whether the hybrid vehicle 1 is stopped. As described above, the battery controller 30 determines that the hybrid vehicle 1 is stopped when the battery controller 30 detects the non-running signal, runnable signal and engine stopped signal transmitted from the control unit 60. When it is determined that the hybrid vehicle 1 is not stopped (No) in step S1, the battery controller 30 executes the process in step S1 again after a predetermined period of time has elapsed.

On the other hand, when it is determined in step S1 that the hybrid vehicle 1 is stopped (Yes), the process proceeds to step S2. In step S2, the battery controller 30 instructs the voltage detecting means 40 to detect a battery voltage (voltage between the terminals) of each of the lithium ion secondary batteries 100 of the battery pack 10. By so doing, the battery voltage (voltage between the terminals) of each of the lithium ion secondary batteries 100 of the battery pack 10 is detected by the voltage detecting means 40. After that, in step S3, it is determined whether any of the battery voltages detected by the voltage detecting means 40 has reached the lower limit battery voltage (2.3 V in the present embodiment).

In step S3, when it is determined that none of the battery voltages has reached the lower limit battery voltage (2.3 V) (No), the battery controller 30 executes the processes in steps S2 and S3 again after a predetermined period of time has elapsed. On the other hand, in step S3, when it is determined that any of the battery voltages has reached the lower limit battery voltage (2.3 V) (Yes), the process proceeds to step S4. In step S4, the battery controller 30 instructs the engine 3 to start up. By so doing, the engine 3 enters an operating state (idling state), and the alternator 9 is driven accordingly.

Subsequently, in step S5, the battery controller 30 starts charging the lithium ion secondary batteries 100. Specifically, the battery controller 30 supplies electric power, generated by the alternator 9, to each of the lithium ion secondary batteries 100 of the battery pack 10. After that, in step S6, the battery controller 30 determines whether the amount of charge has reached the quantity of electricity E4 corresponding to 5% of the quantity of electricity E3 (quantity of electricity discharged from the depth of discharge 0% to the depth of discharge 100% in FIG. 6). Specifically, the battery controller 30, after a charge is started, accumulates the electric current detected by the current detecting means 50, and determines whether the electric current accumulated value has reached the quantity of electricity E4.

In step S6, when it is determined that the amount of charge (electric current accumulated value) has not reached the quantity of electricity E4 (No), the battery controller 30 executes the process in step S6 again after a predetermined period of time has elapsed. On the other hand, in step S6, when it is determined that the amount of charge (electric current accumulated value) has reached the quantity of electricity E4 (Yes), the process proceeds to step S7. In step S7, the battery controller 30 stops charging the lithium ion secondary batteries 100. After that, in step S8, the battery controller 30 instructs the engine 3 to stop.

Then, in step S9, the battery controller 30 determines whether one minute has elapsed since the charge has been stopped. In step S9, when it is determined that one minute has not elapsed (No), the battery controller 30 executes the process in step S9 again. On the other hand, in step S9, when it is determined that one minute has elapsed (Yes), the process proceeds to step SA. In step SA, the battery controller 30 instructs the voltage detecting means 40 to detect a battery voltage (voltage between the terminals) of each of the lithium ion secondary batteries 100 of the battery pack 10. By so doing, the battery voltage (voltage between the terminals) of each of the lithium ion secondary batteries 100 of the battery pack 10 is detected by the voltage detecting means 40.

Note that, immediately after being charged, the battery voltage of each lithium ion secondary battery 100 tends to be unstable, so, in the present embodiment, as described above, the battery controller 30 waits until one minute has elapsed after being charged in step S9, and then detects the battery voltage in step SA. By so doing, it is possible to accurately detect the battery voltage of each of the lithium ion secondary batteries 100.

Subsequently, in step SB, the battery controller 30 determines whether all the battery voltages detected by the voltage detecting means 40 are higher than the lower limit battery voltage (2.3 V). In step SB, when it is determined that all the battery voltages are higher than the lower limit battery voltage (Yes), the process proceeds to step SC. In step SC, it is determined that all the lithium ion secondary batteries 100 that constitute the battery pack 10 are normal. This is because, when the lithium ion secondary battery 100 is normal (serviceable), the battery voltage after the lithium ion secondary battery 100 has been charged with the quantity of electricity E4 corresponding to 5% of the quantity of electricity E3 since the battery voltage reached the lower limit battery voltage (2.3 V) is higher than the lower limit battery voltage (about 2.8 V) (see FIG. 6).

On the other hand, in step SB, when it is determined that any of the battery voltages is lower than or equal to the lower limit battery voltage (No), the process proceeds to step SD. In step SD, the battery controller 30 determines that the corresponding lithium ion secondary battery 100 is abnormal. In this case, for example, the battery controller 30 may output a battery abnormality signal to warn a driver, or the like, of an occurrence of a battery abnormality (for example, causes a battery abnormality warning lamp to light up). After the process in step SC or in step SD is executed, a series of processes ends. After that, as a predetermined period of time has elapsed, the battery controller 30 executes the process in step S1 again.

Note that in the present embodiment, the process in step S2 may be regarded as a voltage detecting step. In addition, the process in step S3 may be regarded as a lower limit determination step. In addition, the processes in steps S5 to S7 may be regarded as a charging step. Then, the processes in steps SB to SD may be regarded as an abnormality determination step.

In the above description, the aspects of the invention are described in accordance with the embodiment; however, the aspects of the invention are not limited to the above embodiment. Of course, the aspects of the invention may be appropriately modified into various forms without departing from the scope of the invention.

For example, in the lithium ion secondary battery system 6 according to the embodiment, each lithium ion secondary battery 100 includes $LiFePO_4$ as the positive electrode active material. Instead, the positive electrode active material of the lithium ion secondary battery is not limited to $LiFePO_4$ but $LiMnPO_4$ may be used as the positive electrode active material. When the lithium ion secondary battery includes $LiMnPO_4$ as the positive electrode active material, the maximum value B of the positive electrode potential of the flat portion is about 4.0 V. The negative electrode dissolution potential C is 1.2 V and is unchanged.

Thus, when each lithium ion secondary battery includes $LiMnPO_4$ as the positive electrode active material, it is only necessary that the lower limit battery voltage is set at a value that falls within the range higher than 2.8 V (=B−C) and lower than or equal to 3.0 V (=B−C+0.2) (for example, 2.9 V), and control similar to the embodiment (the processes in steps S1 to SD) is executed. By so doing, it is possible to suppress a dissolution of the negative electrode current collector to prevent the service life of the battery from shortening because of an internal short circuit. In addition, it is possible to increase the discharge capacity of the lithium ion secondary battery.

In addition, in the embodiment, when the hybrid vehicle is stopped, the battery is charged when the battery voltage has reached the lower limit battery voltage. However, even when the vehicle is in another state other than when the vehicle is stopped (running, idling, or the like), the battery may be charged when the battery voltage has reached the lower limit battery voltage.

In addition, in the present embodiment, the lithium ion secondary batteries mounted on the hybrid vehicle are controlled. However, not only the lithium ion secondary battery that is used as a power source for the hybrid vehicle but also a lithium ion secondary battery that is used as a power source for another electronic equipment may be charged when the battery voltage has reached the lower limit battery voltage. By so doing, it is possible to suppress a dissolution of the negative electrode current collector to prevent the service life of the battery from shortening because of an internal short circuit.

In addition, in the present embodiment, after it is determined in step S1 that the hybrid vehicle 1 is stopped, and the battery voltage of each lithium ion secondary battery 100 is detected in step S2. Instead, after it is determined that the hybrid vehicle 1 is stopped, it is applicable that the ambient temperature around the battery pack 10 and the temperature of each lithium ion secondary battery 100 are detected by the temperature detecting means 70 and, only when all the detected temperatures fall within the range between 0° C. and 40° C., the battery voltage of each lithium ion secondary battery 100 is detected. This is because, when any of the temperatures falls outside the above range, the battery voltage may be unstable.

Furthermore, after it is determined that the hybrid vehicle 1 is stopped, it is applicable that it is determined whether a variation width of the ambient temperature around the battery pack 10 over last ten seconds is within 3° C. and, only when the variation width is within 3° C., the battery voltage of each lithium ion secondary battery 100 is detected. This is because, when variations in ambient temperature are large, the battery voltage may be unstable even when the ambient temperature around the battery pack 10 and the temperature of each lithium ion secondary battery 100 all fall within the range between 0° C. and 40° C.

While the various elements of the example embodiments are shown in various combinations and configurations, other combinations and configurations, including more, less or only a single element, are also within the scope of the invention.

The invention claimed is:

1. A control method for a lithium ion secondary battery that includes a positive electrode having a positive electrode active material that performs charge and discharge of a two-phase coexistence type, and a negative electrode having a negative electrode active material and a negative electrode current collecting member,
the lithium ion secondary battery being mounted and used in a hybrid vehicle as a driving source for the hybrid vehicle, wherein
when a negative electrode potential value of the lithium ion secondary battery, at which the negative electrode current collecting member dissolves is a negative electrode dissolution potential value, and a battery voltage of the lithium ion secondary battery, at which the negative electrode potential value has reached the negative electrode dissolution potential value, is a dissolution battery voltage value, the lithium ion secondary battery has a characteristic that, when, among points located on a discharge-time positive electrode potential curve that represents behavior of a positive electrode potential when the lithium ion secondary battery is discharged until the battery voltage value of the lithium ion secondary battery decreases from an upper limit battery voltage value to the dissolution battery voltage value, a point that indicates a positive electrode potential value at which the negative electrode potential value is the negative electrode dissolution potential value is a positive electrode dissolution corresponding point and a point that indicates a positive electrode potential value at which the battery voltage value is the upper limit battery voltage value is a positive electrode upper limit corresponding point in the discharge-time positive electrode potential curve has a flat portion, at which a variation width of the positive electrode potential is within 0.1 V, appears over 50% or above of a range starting from the positive electrode dissolution corresponding point toward the positive electrode upper limit corresponding point within an electricity quantity range from the positive electrode upper limit corresponding point to the positive electrode dissolution corresponding point, and the lithium ion secondary battery exhibits a characteristic that, when the lithium ion secondary battery is discharged until the battery voltage value of the lithium ion secondary battery decreases from the upper limit battery voltage value to the dissolution battery voltage value, the negative electrode potential, in a late stage of discharging, increases as the negative electrode potential approaches the negative electrode dissolution potential value and reaches the negative electrode dissolution potential value, the control method comprising: performing a charging step of charging the lithium ion secondary battery with a predetermined quantity of electricity when the battery voltage of the lithium ion secondary battery has decreased to a lower limit battery voltage value that is set at a value that falls within a range higher than (B−C) V and lower than or equal to (B−C+0.2) V where a maximum value of the positive electrode potential of the flat portion is B (V) and the negative electrode dissolution potential value is C (V).

2. The control method for a lithium ion secondary battery according to claim 1, wherein
a process of the charging step is performed when the hybrid vehicle is in a stopped state.

3. The control method for a lithium ion secondary battery according to claim 2, further comprising:
performing a voltage detecting step of detecting the battery voltage of the lithium ion secondary battery when the hybrid vehicle is in the stopped state; and
performing a lower limit determination step of determining whether the battery voltage detected in the voltage detecting step has decreased to the lower limit battery voltage value, wherein
the process of the charging step is performed when it is determined in the lower limit determination step that the battery voltage has decreased to the lower limit battery voltage value.

4. The control method for a lithium ion secondary battery according to claim 1, further comprising:
performing an abnormality determination step of determining that the lithium ion secondary battery is abnormal when the battery voltage of the lithium ion secondary battery after the process of the charging step has been performed is not a value that is higher than the lower limit battery voltage value.

5. The control method for a lithium ion secondary battery according to claim 1, wherein the positive electrode active material is a chemical compound expressed by $LiM1_{(1-x)}M2_xPO_4$ (where M1 is Fe or Mn, M2 is at least one of Mn, Cr, Co, Cu, Ni, V, Mo, Ti, Zn, Al, Ga, B or Nb (provided that Mn is excluded when M1 is Mn), and $0 \leq X \leq 0.1$).

6. The control method for a lithium ion secondary battery according to claim 5, wherein
the positive electrode active material is $LiFePO_4$,
the negative electrode current collecting member is made of copper, and
the lower limit battery voltage value is set at a value that falls within a range higher than 2.2 V and lower than or equal to 2.4 V.

7. A lithium ion secondary battery system comprising:
a lithium ion secondary battery that includes a positive electrode having a positive electrode active material that performs charge and discharge of a two-phase coexistence type and a negative electrode having a negative electrode active material and a negative electrode current collecting member,
the lithium secondary battery being mounted and used in a hybrid vehicle as a driving source for the hybrid vehicle; and
a control portion that controls charge and discharge of the lithium ion secondary battery, wherein
when a negative electrode potential value at which the negative electrode current collecting member dissolves is a negative electrode dissolution potential value, and a battery voltage of the lithium ion secondary battery, at which the negative electrode potential value has reached the negative electrode dissolution potential value, is a dissolution battery voltage value, the lithium ion secondary battery has a characteristic that, when, among points located on a discharge-time positive electrode potential curve that represents behavior of a positive electrode potential when the lithium ion secondary battery is discharged until the battery voltage value of the lithium ion secondary battery decreases from an upper limit battery voltage value to the dissolution battery voltage value, a point that indicates a positive electrode potential value at which the negative electrode potential value is the negative electrode dissolution potential value is a positive electrode dissolution corresponding point and a point that indicates a positive electrode potential at which the battery voltage value is the upper limit battery voltage is a positive electrode upper limit corresponding point, in the discharge-time positive electrode potential curve, a flat portion, at which a variation width of the positive electrode potential is within 0.1 V, appears over 50% or above of a range starting from the positive electrode dissolution corresponding point toward the positive electrode upper limit corresponding point within an electricity quantity range from the positive electrode upper limit corresponding point to the positive electrode dissolution corresponding point, and the lithium ion secondary battery exhibits a characteristic that, when the lithium ion secondary battery is discharged until that the battery voltage value of the lithium ion secondary battery decreases from the upper limit battery voltage value to the dissolution battery voltage value, the negative electrode potential, in a late stage of discharging, increases as the negative electrode potential approaches the negative electrode dissolution potential value and reaches the negative electrode dissolution potential value, and
the control portion executes control to charge the lithium ion secondary battery with a predetermined quantity of electricity when the battery voltage of the lithium ion secondary battery has decreased to a lower limit battery voltage value that is set at a value that falls within a range higher than (B−C) V and lower than or equal to (B−C+0.2) V where a maximum value of the positive electrode potential of the flat portion is B (V) and the negative electrode dissolution potential is C (V).

8. The lithium ion secondary battery system according to claim 7, wherein
the lithium ion secondary battery system is mounted on a hybrid vehicle, and
the control portion executes control to charge the lithium ion secondary battery with the predetermined quantity of electricity when the hybrid vehicle is in a stopped state.

9. The lithium ion secondary battery system according to claim 8, further comprising:
a stop determination portion that determines whether the hybrid vehicle is in a stopped state;
a voltage detection instructing portion that, when it is determined that the hybrid vehicle is in the stopped state, issues an instruction to detect the battery voltage of the lithium ion secondary battery when the hybrid vehicle is stopped; and
a lower limit determination portion that determines whether the battery voltage detected through the instruction has decreased to the lower limit battery voltage value, wherein
when the lower limit determination portion determines that the detected battery voltage has decreased to the lower limit battery voltage value, the control portion executes control to charge the lithium ion secondary battery with the predetermined quantity of electricity.

10. The lithium ion secondary battery system according claim 7, further comprising:
an abnormality determination portion that determines that the lithium ion secondary battery is abnormal when the battery voltage of the lithium ion secondary battery after being charged with the predetermined quantity of electricity is not a value that is higher than the lower limit battery voltage value.

11. The lithium ion secondary battery system according to claim 7, wherein the positive electrode active material is a chemical compound expressed by $LiM1_{(1-x)}M2_xPO_4$ (where M1 is Fe or Mn, M2 is at least one of Mn, Cr, Co, Cu, Ni, V, Mo, Ti, Zn, Al, Ga, B and Nb (provided that Mn is excluded when M1 is Mn), and $0 \leqq X \leqq 0.1$).

12. The lithium ion secondary battery system according to claim 11, wherein
the positive electrode active material is $LiFePO_4$,
the negative electrode current collecting member is made of copper, and
the lower limit battery voltage value is set at a value that falls within a range higher than 2.2 V and lower than or equal to 2.4 V.

* * * * *